United States Patent

[11] 3,625,771

| [72] | Inventors | Frank C. Arrance<br>Costa Mesa;<br>Albert G. Rosa, Placentia, both of Calif. |
|---|---|---|
| [21] | Appl. No. | 810,945 |
| [22] | Filed | Mar. 27, 1969 |
| [45] | Patented | Dec. 7, 1971 |
| [73] | Assignee | McDonnell Douglas Corporation<br>Santa Monica, Calif. |

[54] BATTERY SEPARATOR
24 Claims, 10 Drawing Figs.

[52] U.S. Cl. .................................................. 136/145,
136/146, 260/2.5 M
[51] Int. Cl. ..................................................... H01m 3/02
[50] Field of Search............................................. 136/145,
146; 264/122; 260/2.5 M, 37 R

[56] References Cited
UNITED STATES PATENTS

| 2,181,299 | 11/1939 | Burgess ........................ | 136/146 |
| 3,328,207 | 6/1967 | Beaulieu........................ | 136/146 |
| 3,351,495 | 11/1967 | Larsen et al. ................. | 136/146 |

Primary Examiner—Donald L. Walton
Attorney—Max Geldin

ABSTRACT: Production of a flexible battery separator, according to one embodiment, by dip-coating an electrode such as a silver or zinc electrode in a mixture of a major portion of an inorganic or ceramic separator material, a minor portion of potassium titanate, and a minor portion of a mixture of organic substances including an organic polymer, e.g., polyphenylene oxide, and a material or ester derived from certain acids such as azelaic acid, e.g., di-isooctyl azelate or polypropylene polyazelate, such mixture of organic substances being dissolved in a suitable solvent such as chloroform. The electrode is placed in the mixture, preferably maintained under vibration, and stirred, the electrode and applied coating are removed from the mixture, and the coating is air-dried to remove solvent and is cured at elevated temperature. Alternatively, such a flexible separator can be formed on any suitable supporting surface, such as glass plate, and the resulting flexible separator stripped from such plate to produce a flexible porous, substantially inorganic separator membrane for incorporation between the electrodes of a battery. Alternatively, a flexible porous substrate or matrix, preferably in the form of a compartment for insertion therein of a battery electrode, can be placed in the above-noted mixture of inorganic material and organic substances, the substrate and applied coating removed from the mixture, and the coating dried to remove solvent and cured at elevated temperature. In each case, the separator film (a) applied directly on the battery electrode, or (b) cast as a flexible free film, or (c) coated on or impregnated into a flexible matrix, has improved high flexibility and low resistivity properties, and has high resistance to alkali and to elevated temperatures, and is smooth and uniform in thickness.

PATENTED DEC 7 1971

FRANK C. ARRANCE
ALBERT G. ROSA
INVENTORS

BY Max Geldin

ATTORNEY

PATENTED DEC 7 1971

INVENTORS
FRANK C. ARRANCE
ALBERT G. ROSA
BY Max Geldin
ATTORNEY

BATTERY SEPARATOR

This invention relates to production of flexible porous membranes, especially flexible porous separators for use in a battery, particularly a high energy density battery, and which is composed in preferred practice chiefly of inorganic material, and which is resistant to chemicals such as alkaline solutions, has good strength, and which will withstand operation in a battery at elevated temperatures of the order of 100° C. and above, and particularly characterized by high flexibility and low resistivity; and is especially concerned with the provision of such flexible porous separator films applied and adhered to the surface of an electrode, or in the form of a flexible free film, or in the form of a film applied to or impregnated into a flexible matrix which can be employed as a housing or compartment for a battery electrode.

The invention is also concerned with procedure for producing such flexible membranes or separators and to batteries incorporating same.

Batteries are an important source of energy storage for power generation. In addition to the common lead-acid storage battery, an important type of battery is the high energy density alkaline electrolyte battery using such electrode combinations as silver-zinc, silver-cadmium and nickel-cadmium. High energy density batteries are generally battery systems which have a substantially higher energy per unit of weight than conventional, e.g., lead-acid, storage batteries. Such high energy density batteries have many applications such as in portable tools and appliances, television, radio and record players, engine starting, portable X-ray units, and the like. In such batteries, it is conventional to employ a separator in the form of a porous member between the electrodes.

In high energy density batteries such as silver-zinc, nickel-cadmium and silver-cadmium, the separator performs the function of retaining electrolyte, e.g., potassium hydroxide, separating the electrodes, and permitting transfer of electrolyte ions but preventing migration of electrode ions or growth of dendritic crystals of electrode ions which short circuit the battery.

Improved inorganic separators in the form of certain aluminosilicates which are particularly suited for use in high energy density batteries are described, for example, in U.S. Pat. No. 3,379,570. Such inorganic separators, preferably in the form of sintered ceramic separators, when assembled in a battery of this type, e.g., a silver-zinc high energy density battery, have resulted in substantially improved battery life at both ambient temperature and elevated temperature, that is, a battery capable of operating efficiently over a large number of discharge-charge cycles, and such batteries are also operable at high temperature, e.g., of the order of 100° C. and above.

However, these rigid sintered separators present certain manufacturing, design and assembly problems. Thus, the production of the above-noted rigid inorganic separators, which are in the form of very thin membranes, requires a certain care in handling, packing and assembling in a battery to prevent cracking and breaking thereof. It has, therefore, assumed considerable importance to provide an inorganic separator which is readily produced and having the advantageous properties of the inorganic separators noted above, that is, having low resistivity, resistance to corrosive chemicals and operability at elevated temperatures, e.g., about 100° C. but which, in addition, is flexible and thus avoids the disadvantages of the rigid inorganic separators.

Further, the above inorganic separators or membranes are substantially rigid, and when employed in a battery between adjacent electrodes, e.g., zinc and silver electrodes, during operation of the battery, the electrodes, particularly the zinc electrode, tends to change shape and to move out of complete contact with the separator, thus reducing the electrical efficiency of the battery. Also, when employing the above-noted substantially rigid inorganic separators, it is necessary, when assembling such separators in a battery, together with the necessary electrodes or electrode plates, to provide electrode compartments between adjacent separators, and to then insert the electrodes in the electrode compartments between an adjacent pair of separators. This not only requires proper spacing of the separators so as to receive the electrodes therebetween in relatively snug-fitting relation, but also requires that the electrode compartments on opposite sides of a separator be properly insulated to prevent short circuiting of electrolyte from one electrode compartment around a separator and into the adjacent electrode compartment. Accordingly, a further particular area of interest has been the need for provision of flexible membranes or films which operate efficiently as a separator and avoid the disadvantages of separate rigid separators noted above.

The drawbacks of conventional flexible organic or plastic separators, e.g., cellophane, sausage casing and the like, have long been recognized and are well known. That is, degradation of such plastic separators by hydrolysis and oxidative attack severely limit the capability of these separators in alkaline batteries, especially in the silver-zinc battery.

In the copending application of Frank C. Arrance, Ser. No. 676,223, filed Oct. 18, 1967 now U.S. Pat. No. 3,542,596, there is described production of a flexible separator composed essentially of an inorganic material, in the form either of a free flexible film, or a flexible film which can be attached directly to an electrode, and which flexible separator is formed by applying to a rigid substrate such as a glass plate or to an electrode itself, e.g., by coating, a mixture of a major portion of an inorganic or ceramic separator material, a minor portion of potassium titanate in short fiber form, and a minor portion of an organic polymer, e.g., polyphenylene oxide, dissolved in a suitable solvent such as chloroform.

In the copending application of Frank C. Arrance et al., Ser. No. 707,808, filed Feb. 23, 1968, there is described an improved flexible porous separator, preferably employing a composition essentially similar to that of the above copending application, Ser. No. 676,223, by coating, filling or impregnating, a suitable flexible porous substrate or carrier material, such as fuel cell asbestos, with a mixture of separator materials essentially of the type described in the last-mentioned copending application. According to one embodiment of above Ser. No. 707,808, the flexible porous matrix impregnated or coated with a separator film is of box-shaped configuration or envelope, and the resulting impregnated and coated flexible envelope forms an electrode compartment into which an electrode such as the zinc electrode can be inserted to form a flexible separator-electrode unit.

However, in practice it was found that separator films of the type formed according to the above copending applications, Ser. Nos. 676,223 and 707,808, having high inorganic filler concentrations, e.g., of the order of about 95 percent, are not sufficiently flexible for use in complex, folded configurations. Further, although the flexible separators of the above copending applications have highly satisfactory resistivity, in certain battery applications it is desirable to still further reduce separator resistivity. Thus, the flexible essentially inorganic separator systems of the above copending applications, although satisfactory in usual high energy density battery operations, often have limitations in cell design and particularly in high rate battery applications.

It has now been found, according to the present invention, that an improved flexible porous separator of the types described in the above copending applications, Ser. Nos. 676,223 and 707,808, and composed essentially of an inorganic material, can be produced by addition of an organic material derived from azelaic acid, pelargonic acid, or oleic acid, preferably in the form of an ester of such acids, and which can be monomeric or polymeric, as described more fully below, to the mixture of inorganic separator material, potassium titanate and organic polymer or binder, e.g., polyphenylene oxide, during processing of the flexible separator, and curing.

Thus, the improved flexible porous battery separator or film is produced according to the invention by a process which comprises applying on a support surface a film consisting essentially of a mixture of a major portion of a porous particulate inorganic material, a minor portion of potassium titanate particles, preferably in the form of short fibers, and a minor portion of a mixture of a first organic component in the form of a curable organic polymer and a second organic component in the form of a material derived from an acid selected from the group consisting of azelaic, pelargonic and oleic acids, said mixture of said first organic component and said second organic component being capable of bonding the particles of said inorganic material and said potassium titanate together upon curing and forming a porous structure, said organic components being dissolved in a volatile solvent, such as chloroform, curing said coated film, as by heating the coated film at elevated temperatures, and forming a flexible porous separator.

It has been found that by incorporating together with the curable organic polymer employed in the above-noted applications, e.g., polyphenylene oxide, an organic material derived from the above-noted acids, e.g., certain polymers of the esters of such acids, e.g., polypropylene polyazelate, porous films which are highly flexible and which can be fabricated in thickness as thin as 0.001 inch, can be produced, and that such improved separators in addition have substantially decreased resistivity, of the order of about 5 ohm-cm., or lower. Further, such separator films have high resistance to alkali solutions and can be formed in smooth surfaces of highly uniform thickness even when the separator is as thin as 0.001 inch. Further, such separator films can withstand heat sterilization at elevated temperatures of the order of 140° to 150° C. and possess high rate discharge capabilities. High energy density batteries, such as silver-zinc batteries, fabricated employing the improved highly flexible separators according to the invention, have shown superior cycle life as compared to the same batteries employing conventional separators.

In producing an improved flexible separator according to the invention, inorganic or ceramic separator material of any suitable type such as those described hereinafter, and potassium titanate fibers, preferably of a size less than about 0.008 inch in length, are mixed together in major and minor proportions respectively, to form a highly uniform mixture of the inorganic separator material and potassium titanate fibers, essentially free of agglomerates or clumpy portions.

The inorganic separator material which can be used to form the flexible separators of the invention can include a variety of porous inorganic or ceramic substances in powder or particulate form. Thus, for example, suitable inorganic separator materials include insoluble hydrous metal oxides such as the hydrous oxides of zirconium, titanium, antimony, tungsten, silicon, scandium bismuth, vanadium, aluminum and cerium, in particulate form. A preferred separator of this type is hydrous zirconium oxide or zirconia.

Other porous inorganic materials which can be employed for producing the separator according to the invention include particulate sintered aluminosilicates, especially the alkali metal and alkaline earth metal aluminosilicates and alumina, because of their formation of a hard ceramic material upon sintering, while still retaining suitable porous characteristics. The aluminosilicates of suitable porous internal structure are particularly preferred in this respect. Examples include nonfluxed aluminosilicate, fluxed aluminosilicates or salts thereof, such as sodium and potassium aluminosilicates, e.g., magnesium aluminosilicate (Cordierite). These materials can be used separately, but often mixtures of the particulate aluminosilicates are used, e.g., complex mixtures of both the alkali metal and alkaline earth metal aluminosilicates. Such aluminosilicate separator materials are described in the above U.S. Pat. No. 3,379,570.

Another useful class of inorganic separator materials are the naturally occuring clay minerals of the kaolinite group. This is a group of naturally occurring clays containing aluminum oxide and silica, usually together with bound water, and having the formula $Al_2O_3 \cdot 2SiO_2 \cdot 2H_2O$. In addition to kaolinite, other useful members of this group include the mineral clays halloysite, dickite, nacrite and anauxite.

Other types of inorganic separator materials which can be employed include those in the form of a particulate sintered porous solid solution of magnesium silicate and a member selected from the group consisting of zinc silicate and iron silicate as described and claimed in the copending application, Ser. No. 539,554 filed Apr. 1, 1966, of Frank C. Arrance et al., now U.S. Pat. No. 3,446,668, and which includes the naturally occurring magnesium-iron silicate solid solution known as the mineral Olivine, and the inorganic separator materials in the form of a particulate sintered porous solid solution of an aluminum-bearing material such as aluminum oxide, and a substance selected from the group consisting of chromium, cobalt, nickel, magnesium, calcium and iron-bearing materials, e.g., a mixture of alumina and chromic oxide, as described and claimed in copending application, Ser. No. 555,891, filed June 7, 1966, of Frank C. Arrance, et al., now U.S. Pat. No. 3,446,669.

Still another form of inorganic separator material which can be employed according to the invention are porous sintered separators consisting essentially of a solid solution of a major portion of magnesium oxide and a minor proportion of an oxide such as zirconium dioxide, chromic oxide, aluminum oxide, titanium oxide, and certain other oxides, as described in copending application, Ser. No. 727,394, filed May 8, 1968 of F. C. Arrance, et al., now U.S. Pat. No. 3,575,727.

Also, inorganic separator materials derived from natural chromite, termed ferrochromite, and containing oxides of iron, magnesium, aluminum and chromium and formed into a sintered solid solution, as described and claimed in copending application Ser. No. 727,678 of F. C. Arrance, filed May 8, 1968, now U.S. Pat. No. 3,539,394, can be employed.

As further examples of inorganic separator materials which can be employed are sintered zirconia separators, e.g., calcia stabilized zirconia, and sintered alumina separators.

An exemplary form of calcia stabilized zirconia is produced by heating a mixture of 96 percent zirconia ($ZrO_2$), and 4 percent calcium oxide to temperature of the order of about 3,000° F., to form a solid solution of calcium oxide and zirconium oxide, forming a mixture containing 97 percent of the resulting calcia stabilized zirconia and 3 percent bentonite, presintering such material at 1,000° to 1,200° C., ball milling such sintered material to small particle size, compacting such material into separator membranes at pressures ranging, e.g., from about 2,000 to about 10,000, p.s.i., and sintering again to temperature of about 1,000° to about 1,200° C., to produce zirconia separator membranes.

An exemplary form of alumina separator material is formed by compacting alumina (aluminum oxides), e.g., at pressures of about 5,000 to 10,000 p.s.i., into membranes, and sintering such membranes at temperatures ranging from about 300° to about 1,800° C.

As a further example, inorganic separator materials formed from chrome-iron and known as spinelloids and formed of $FeO,CrO_3$ and comprising 35 to 50 percent chromic oxide, together with some silica as magnesium silicates, can also be employed.

Additional inorganic materials in particulate form which can be employed include silicates such as magnesium silicate (Fosterite), and the like.

Preferred inorganic separator materials are those selected from the group consisting of (a) a solid solution of magnesium silicate and iron silicate, (b) zirconia, (c) a solid solution of a major portion of magnesium oxide and a minor proportion of an oxide selected from the group consisting of zirconium dioxide and chromic oxide, and (d) a solid solution of ferrochromite.

It will be understood that mixtures of the above particulate materials also can be employed.

The term "inorganic separator material" or "sintered ceramic separator material" as employed herein is intended to denote any of the above-noted sintered inorganic separator materials.

The first organic component incorporated with the inorganic or ceramic materials or powders noted above to produce the flexible membrane or separator of the invention, are organic polymeric materials preferably chosen from those curable polymers which have the property of functioning to bond the individual particles of inorganic materials and the potassium titanate fibers together upon curing of these polymers, but do not fill the voids between the ceramic material and potassium titanate particles, so as to result in a porous structure effective when used as a battery separator. A preferred polymeric material providing the first organic, i.e. curable polymer component employed in the coating mixture according to the invention, and which has been found particularly advantageous is polyphenylene oxide (marketed as PPO by General Electric). Polysulfone can also be employed but results in a less porous separator of higher resistivity than when employing polyphenylene oxide. Also, polyamides such as nylon, neoprene rubber, polyepoxides, such as the polymer of bisphenol A and epichlorhydrin (the Epons), and fluorocarbon polymers such as vinylidene fluoride polymers (Kynar), and the copolymer of hexafluoropropylene and vinylidene fluoride (Viton) can be employed.

The second organic component employed in the coating mixture according to the invention, are monomers or polymers, derived from azelaic acid, pelargonic acid and oleic acid, and incorporated with the above-noted curable organic polymeric materials or binders, e.g., polyphenylene oxide, for producing the improved flexible separators hereof. Preferably, compounds illustrating such second component, are the esters of the above-noted acids, that is, they are monomeric or polymeric azelate, pelargonate and oleate esters. Generally, aliphatic esters of these types can be employed in which the aliphatic radical can contain from about two to about 12 carbon atoms. Also, heterocyclic esters, e.g., tetrahydrofurfuryl esters of the above acids can be employed. As previously noted, such esters can be monomeric or polymeric, particularly in the case of esters of pelargonic acid and azelaic acid, which is a dibasic acid. Thus, for example, polymeric alkylene esters of azelaic acid can be employed, in which such alkylene groups contain from two to three carbon atoms. Although such polymeric esters can vary widely in molecular weight, generally suitable polymers of this type for purposes of the invention have an average molecular weight range from about 800 to about 10,000, preferably from about 2,000 to about 6,000.

Typical examples of monomeric azelates, pelargonates and oleates, which can be employed, are di-2-ethylhexl azelate, di-isooctyl azelate, and di-n-hexl azelate; diethylene glycol dipelargonate, trithethylene glycol dipelargonate, butanediol dipelargonate and 2-butoxyethyl polargonate; tetrahydrofurfuryl oleate and diethylene glycol monooleate. Examples of preferred polymers are polypropylene and polyethylene polyazelates, particularly the former. These polymers or polyazelates generally have an average molecular weight range from about 850 to about 6,000, and are particularly preferred for production of improved flexible separators of the invention. Such polymers can, but do not necessarily, contain additives incorporated therein, e.g., to control molecular weight by functioning to retard or prevent further polymerization of such polymers. These additives can include phthalates such as dioctyl phthalate, alkanoates and alkanes, having, e.g., from eight to 16 carbon atoms, such as decanoic acid, and the like. The term "polypropylene polyazelate phthalate alkanate" as employed herein is intended to denote polypropylene polyazelate polymer containing phthalate and alkanoate or alkane additives as above defined. Polymers containing such additives generally have a lower molecular weight as compared to the same polymer in the absence of such additives.

The above examples of monomeric and polymeric esters can range from very fluid to very viscous materials. Combinations of these esters can also be employed, such as a combination of polymeric azelate and a monomeric pelargonate.

The above-noted monomeric and polymeric azelates, polargonates and oleates are marketed as "Plastolein" by Emery Industries, Inc. of Cincinnati, Ohio.

As noted above, it has been found that the potassium titanate, although in fiber form, preferably is used as very short fibers not longer than about 0.008 inch, to avoid clumping and agglomeration of the mixture. It is also preferred that the inorganic or ceramic powder be ground to a particle size such that about 95 percent of the particles of such inorganic material are of less than 10 micron particle size.

The relative proportions of inorganic or ceramic material, potassium titanate particles, and combination of first organic component or polymeric binder, and second organic component derived from the above acids, employed for producing the flexible membranes of the invention, can vary. The amount of ceramic powder and potassium titanate together preferably should be at least 50 percent, and preferably substantially greater than 50 percent, of the mixture, and the amount of either the ceramic material or the potassium titanate employed can be less than or in excess of 50 percent of the mixture; ordinarily, the inorganic or ceramic material is present in major proportion and the potassium titanate in minor proportion. The amount of total organic material, including both the above-noted first and second organic components, can vary widely and can constitute as much as 50 percent or more of the mixture, but under these conditions the result is a separator of increased internal resistance, although having greater flexibility. Hence, in preferred practice, the total amount of the mixture of first and second organic components is employed in minor proportions to obtain sufficient bonding and porosity, yet to afford substantial flexibility. Thus, for example, generally there can be employed from about 50 to about 95 percent of inorganic or ceramic powder, and about 2 to about 35 percent potassium titanate fibers, and about 2 to about 48 percent by weight, of total organic material, including both the first and second organic components. However, in certain instances and for certain applications, as much as 95 percent or more of inorganic material can be employed together with the combined organic components according to the invention, while still obtaining highly flexible separators having low resistivity.

For reasons pointed out more fully below, the proportion of second organic component, that is monomeric or polymeric ester, present in the mixture of curable organic polymer, e.g., polyphenylene oxide, and such ester, can vary, but usually ranges from about 5 to about 50 percent by weight of the mixture. Below about 5 percent by weight of the second organic component in the mixture of the two organic components, the benefits of the invention in terms of obtaining an improved flexible separator, over the same flexible separator but in the absence of such second component, is not obtained, and if more than about 50 percent of the acid derived second component is employed in the mixture of organic components, when this mixture is dissolved in a solvent as described more fully below, generally there is a tendency toward the separation of the organic solvent solution into two separate phases, which is undesirable, since in order to obtain best results according to the invention, the mixture of curable organic polymer, the first polymer component, and acid derived material, the second organic component, should be homogeneously mixed.

The proportion of the total mixture of organic polymer binder and acid derived organic material, employed in combination with the mixture of inorganic or ceramic material and potassium titanate, is chosen to provide a membrane or separator of improved flexibility and film strength, and of improved low resistivity and other characteristics permitting the membrane to function efficiently as a battery separator, especially in high energy density alkaline batteries.

The mixture of organic polymer and acid derived material or ester, is dissolved in a common solvent vehicle, which dissolves both components and which has good volatility, to permit quick removal of the solvent from the coated film. Any suitable solvent having these characteristics can be employed. The particular solvent chosen depends in large measure on the particular organic components employed. Thus, for example, chloroform, trichloroehtylene, toluene, mixtures of chloroform and carbon tetrachloride, and mixtures of chloroform and trichloroethylene have been found particularly suitable for use with polyphenylene oxide polymer, and with the polymeric azelates, pelargonates and oleates. Dimethyl acetamide has been found suitable for use with polysulfone and fluorocarbon polymers, and toluene has been found suitable for employment with neoprene rubber and epoxy material. The amount of solvent employed can vary, but generally the amount employed is such that the organic or polymeric solids content ranges from about 20 to about 70 parts per 100 parts by weight of solvent, the amount of solvent used being such that it is readily evaporated in a conveniently short time after film formation.

The slurry of inorganic or ceramic powder, e.g., sintered solid solution of magnesium silicate and iron silicate, and potassium titanate particles, and the mixture of first organic component, e.g., polyphenylene oxide, and acid derived second organic component, e.g., polypropylene polyazelate, dissolved in the solvent, is preferably maintained in vibration, e.g., during dipping of an electrode or support for the coating, or of a porous flexible matrix, in the slurry. This is preferably carried out by applying a suitable mechanical vibration source, e.g., an AC solenoid, preferably adjusted to the proper frequency and amplitude to the dipping mixture to provide the desired flow characteristics of the mixture on the electrode or support, due to the thixotropic nature of the mixture, while at the same time the dipping mixture is subjected to a stirring action to sweep away bubbles which form during coating due to air escaping from the porous electrode plate or porous matrix. The vibration of the dipping mixture results in obtaining a uniform coating of the mixture on the electrode or support for the separator, or uniform impregnation into a flexible porous matrix. The vibration of the dipping mixture is adjusted in relation to the rate of withdrawal of the substrate, e.g., electrode or porous matrix, so as to obtain a thin uniform coating or uniform impregnation without running or "tearing".

After the substrate, e.g., electrode, flexible matrix, or support containing the separator coating or impregnated with the separator material, is removed from the mixture, it is subjected to air drying for solvent removal. The coating is then cured at temperatures which can range from about 100° to about 500° F., with the time of curing depending upon the particular polymer employed, the size of the particular surface area being covered, and other factors, including the temperature of cure. Curing time can range, for example, from about 10 to about 30 minutes at the above elevated temperatures. Although air drying of the coated or impregnated separator film for an extended period of time, e.g., of the order of about 24 hours or more, can eliminate curing at elevated temperatures, this is not preferred practice.

It is believed that the organic or polymeric additive, e.g., diisooctyl azelate or polypropylene polyzelate, functions to control the degree of polymerization of the curable organic polymer, e.g., polyphenylene oxide, during heating and curing thereof, to thereby reduce the amount of cross-linking and setting up of such curable organic polymer, which otherwise takes place in the absence of such additive. The result is a more flexible film, yet one which unexpectedly also possesses improved conductivity or reduced resistivity, and ability to withstand sterilization or heating at high temperatures for extended periods with substantially no adverse effects. For this purpose the use of a polymeric ester is preferred over the monomeric ester since it has been found in practice that the polymeric ester remains securely in the coating after curing the coating, whereas the monomer has a tendency to be removable, and can be extracted therefrom.

The thickness of the resulting flexible, substantially inorganic film or separator formed on the electrode, support, or other surface, e.g., porous flexible matrix, can range, e.g., from about 0.001 to about 0.025 inch. As previously noted, according to the present invention, such separator films are highly flexible and rugged and durable even when formed in thicknesses as thin as about 0.001 inch, having very low resistivity of the order of about 5 ohm-cm. and can withstand heat sterilization at elevated temperature for extended periods of time.

The porosity of the flexible membranes or separators of the invention can range from about 5 to about 40 percent, but such range is understood to be only exemplary.

Pore sizes or diameters of the flexible, porous membranes generally range from about 1 to about 400 Angstrom units, but can be outside this range.

The invention will be more clearly understood from the further description below of certain embodiments of the invention, taken in connection with the accompanying drawing, wherein.

It will be understood that the showings in the drawing are exaggerated for greater clarity.

Figures 1, 2, 3, 4, 5, 6:
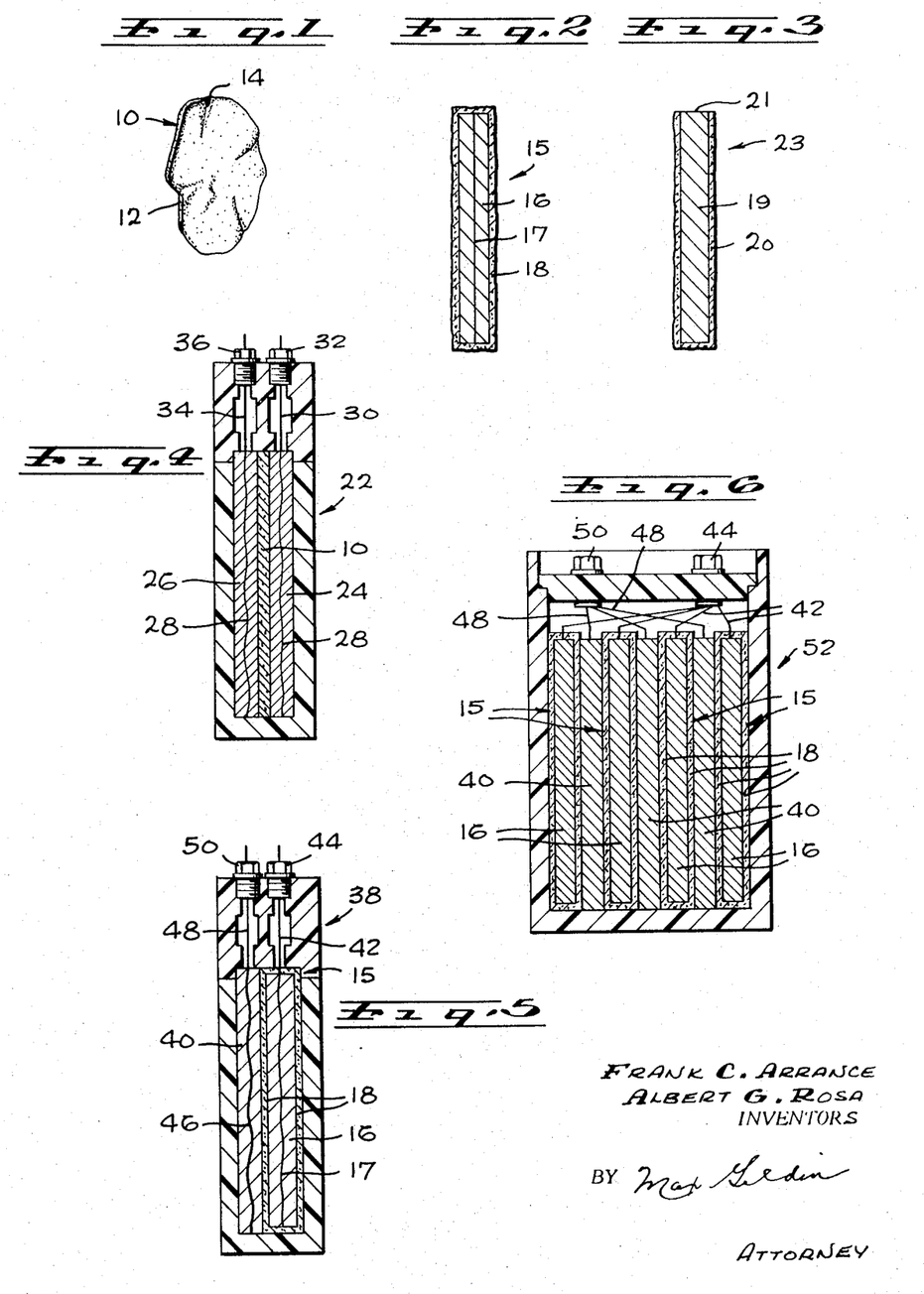
FIG. 1 is an essentially schematic representation of a flexible membrane according to the invention.
FIG. 2 is a schematic representation of an electrode-flexible separator unit of the invention.
FIG. 3 is a modification of the unit of FIG. 1.
FIG. 4 shows the manner of assembly of the flexible separator of FIG. 1 in a single cell battery according to the invention.
FIG. 5 illustrates incorporation of the electrode-flexible separator unit of FIG. 2 in a single cell battery.
FIG. 6 illustrates an assembly of a plurality of the electrode-flexible separator units of FIG. 2 to form a multiplate battery.

The flexible membrane formed of a mixture of the inorganic material, potassium titanate particles, and the combination of first organic component and second organic component derived from the acids above described, and illustrated at 10 in FIG. 1 of the drawing, is highly flexible and can be bent in any direction, as indicated at 12 and 14, but is of considerable strength and is resistant to tearing and can be handled readily without damage. Such flexible membrane can be employed efficiently as a battery separator between electrodes, e.g., silver and zinc electrodes, in a high energy density battery, as illustrated in greater detail below.

According to one feature of the invention as described above, the thin flexible membrane composed chiefly of inorganic material can be formed as a film on a battery electrode. According to this embodiment of the invention, an electrode illustrated at 16 in FIG. 2, e.g., a silver electrode, and preferably containing a collector grid indicated at 17, has formed thereon a securely adherent and flexible coating of the inorganic material, potassium titanate particles, the bonding polymer, and ester additive of the invention, covering the electrode's surface, as indicated at 18. Since the entire surface of the electrode is thus covered by the flexible film, thereby completely encasing the electrode within the flexible separator, the flexible, essentially inorganic separator 18 on the electrode forms a covering which, when the unit 15, comprising the electrode 16 and covering 18, is incorporated in a battery, completely insulates the electrode from an adjacent electrode.

If desired, only a portion of the electrode surface can be coated in the above-described manner with the flexible, essentially inorganic membrane. Thus, as illustrated in FIG. 3, the electrode 19 is coated along the sides and bottom with the flexible membrane 20, according to the invention, leaving the top 21 uncovered. This type of electrode unit 23 can be incorporated in a battery, particularly wherein the electrolyte is filled to a height less than the height of the electrodes.

Any type of electrodes can be insulated and covered with a flexible separator membrane according to the invention. These include the lead electrodes employed in conventional lead-acid batteries, and particularly electrodes employed in high energy density batteries such as silver, zinc, cadmium and nickel electrodes.

During discharge of batteries such as those described and illustrated above, as is well known, e.g., in the case of a silver-zinc battery, the zinc converts to zinc oxide and the silver oxide to silver, and during charging of such batteries the silver is oxidized to silver oxide and the zinc oxide is reduced to zinc. Because of these reversible reactions, the terms "silver" and "zinc", the terms "silver" and "cadmium", the terms "nickel" and "cadmium", and the term "lead" referring to the metals forming the respective electrodes of silver-zinc, silver-cadmium and lead-acid battery systems, are intended to denote either the respective metals themselves or the corresponding oxides thereof.

It will be seen that a plurality of such electrode-separator units 15 or 23 can be readily assembled to form an electrode-separator pack in a battery by simply assembling a number of such electrode-separator units of one polarity, e.g., silver electrode-separator units, in alternating relation with a number of electrodes of opposite polarity, e.g., conventional zinc electrodes, or with a number of zinc-electrode-separator units according to the invention. When so assembled in a battery with the alternate electrode-separator units, e.g., silver-flexible separator units as illustrated in FIG. 2 or 3, in contact with alternate zinc electrodes, an electrode-separator pack is provided readily in which each of the electrode compartments is fully insulated from the adjacent electrode compartments. When assembling the respective electrode-separator units of the invention in a battery to form a battery pack as noted above, there is avoided the problem when employing individual separators and electrodes, of requiring first the proper supporting of such individual separators in suitably spaced relation to provide electrode compartments; and the introduction of the individual electrodes in such compartments.

The following are examples of practice of the invention, all quantities being expressed in terms of parts by weight, unless otherwise indicated.

EXAMPLE 1

A sintered powder composed of a solid solution of magnesium silicate and iron silicate is prepared as follows: Olivine, a magnesium, iron silicate composed of 41,1 percent $SiO_2$; 49.3 percent $MgO$ and 6 percent $FeO$, by weight, is sintered by heating at 1,200° C. The resulting powder is ground to a particle size such that 95 percent of the powder is composed of particles of less than 10 microns size.

Potassium titanate fibers are chopped up into short lengths, sufficiently short so that the chopped fibers pass through a 0.008 inch screen.

A mixture of about 76 parts of the above magnesium silicate-iron silicate powder and about 4 parts of the chopped potassium titanate fibers, is passed through a mill, resulting in a highly uniform, non fluffy mixture of the ceramic powder and the short potassium titanate fibers.

Using chloroform as a solvent, there is first incorporated into the chloroform, 10 parts of polyphenylene oxide, which is dissolved in the chloroform, and while stirring the resulting solution of the polyphenylene oxide dissolved in the chloroform, there is added a mixture of 5 parts of the polymer of polypropylene polyazelate, having an average molecular weight of about 6,000, marketed as Plastolein Type 9789, and 5 parts of the polymer of polypropylene polyazelate containing phthalate and alkanoate additives, having an average molecular weight of about 2,000 to about 3,000, and marketed as Plastolein Type 9750. The solids concentration of the resulting solvent solution of the polymers is about 25 percent.

The above-noted mixture of inorganic powder and potassium titanate fibers is then added to the chloroform solution of the above-noted polymers, thus forming a mixture or slurry, the solids content of which is composed of 80 percent of the mixture of the magnesium silicate-iron silicate solid solution cerarmic powder and potassium titanate particles, about 10 percent polyphenylene oxide, and 10 percent of the mixture of polymeric esters, by weight.

While maintaining the above mixture under vibration and stirring, the mixture is cast onto the surface of a glass plate. The glass plate containing the applied coating is air-dried for 15 minutes to remove solvent, and the coating is then oven cured for 15 minutes at 350° F. The coated cured film is then stripped from the surface of the plate.

The resulting film is highly flexible as indicated at 10 in FIG. 1, has a porosity of about 15 percent and pore size ranging from about 5 to about 100 Angstroms, has good film strength, and can be handled readily without tearing. The thickness of the film is about 0.001 inch.

Resistivity measurements of this flexible porous separator gave low values of about 5 ohm-cm.

The resulting film indicated at 10 in FIG. 1 is assembled in a battery 22 in FIG. 4, together with zinc and silver electrodes 24 and 26, respectively, the flexible separator 10 being disposed between the electrodes and in contact with the adjacent surfaces thereof. Each of the electrodes 24 and 26 has a collector grid 28 therein, the collector grid of the zinc electrode 24 being connected by a lead wire 30 to a terminal 32, and the collector grid 28 of the silver electrode being connected by a lead 34 to a terminal 36 on the battery. A 30 percent potassium hydroxide solution is employed as electrolyte in the battery.

The resulting battery is cycled for about 1,000 cycles of ½-hour discharge 1-hour charge per cycle at both 25° and 100° C., at good electrical efficiency, indicating good secondary battery performance employing the improved flexible separator of the invention.

EXAMPLE 2

The procedure of example 1 is followed, except employing 20 parts of polyphenylene oxide and in the absence of the polyazelate polymers.

The resulting flexible film does not have the high flexibility of the flexible film produced according to example 1 and has a resistivity of the order of about 10 ohm-cm, as compared to the substantially lower resistivity of 5 ohm-cm, for the flexible film of example 1.

EXAMPLE 3

The procedure of example 1 is employed utilizing as the second organic component according to the invention, 10 parts of polypropylene polyazelate, marketed "Plastolein" Type 9789, and having an average molecular weight of about 2,000 to about 3,000, and in the absence of polypropylene polyazelate containing additives. Results similar to those of example 1 are obtained.

EXAMPLE 4

The procedure of examples 1 and 3 is followed for producing various flexible separators according to the invention, except that the sintered powder of a solid solution of magnesium silicate and iron silicate in example 1, is replaced by inorganic powders composed respectively of (a) a sintered calcia stabilized zirconia, as described above, (b) a solid solution of magnesium oxide and chromic oxide, (c) a solid solution of magnesium oxide and zirconium dioxide, and (d) a solid solution of ferrochromite.

The respective flexible separators formed of the inorganic powders (a), (b), (c) and (d), when incorporated in a silver-zinc battery as described in example 1 and illustrated in FIG. 4 of the drawing, provide secondary batteries which can be recycled over a large number of charge-discharge cycles similar to the battery described in example 1.

EXAMPLE 5

A mixture of magnesium silicate-iron silicate solid solution ceramic powder, potassium titanate particles, polyphenylene oxide, and the mixture of polypropylene polyazelates in chloroform is prepared as described in example 1 above.

While maintaining the mixture under vibration, and with stirring, a conventional silver electrode, formed by mixing equal parts of silver and silver oxide and compressing the mixture, is dipped into the mixture and withdrawn at a rate to obtain a thin smooth uniform film having a thickness of about 0.003 inch.

The film formed on the electrode is then air-dried, as described in example 1 above, for 15 minutes to remove solvent and is then oven cured for 15 minutes at 350° F.

The resulting dip-coated separator having a thickness of about 0.003 inch, a porosity of about 12 percent and a pore size ranging from about 5 to 100 Angstroms, has a low resistivity of about 8 ohm-cm., is highly flexible, uniform in thickness, smooth and free from clumps.

The resulting silver electrode-separator unit, as indicated at 15 in FIG. 2 of the drawing, including the attached flexible separator 18, is incorporated in a battery 38 as illustrated in FIG. 5, together with a conventional zinc electrode 40, the unit 15 being disposed substantially in contact with the zinc electrode 40, with an adjacent portion of the flexible film 18 of the silver electrode 16 being in contact with the adjacent surface of the zinc electrode. The collector grid 17 of the silver electrode is connected by a lead 42 to an external terminal 44, and the collector grid 46 of the zinc electrode is connected by means of a lead 48 to a terminal 50.

The resulting battery and also the battery of example 1 operate successfully both at 25° and at 100° C. for more than 750½-hour charge—½ hour discharge cycles at a current density of about 20 ma./cm.$^2$ during discharge, and at 50 percent depth of discharge.

Test cells of the type described in examples 1 and 5 above maintain their nominal OCV (open circuit voltage) at 1.86 volts after being charged and allowed to stand for as long as 9 months and maintain their original capacity and OCV after as many as 300 total discharges at C/2 (half capacity).

A 60 percent cycle life improvement using the arduous cycling regime noted above is realized employing the batteries of examples 1, 3, 4 and 5 above, as compared to conventional batteries employing conventional plastic separators, and the batteries of such examples continue to function normally and maintain the above-noted nominal open circuit voltage of 1.86 volts, indicating no shorting conditions.

EXAMPLE 6

The procedure of example 5 above is followed, except that in place of the silver electrode, nickel and cadmium electrodes respectively, are dip-coated as described in example 5.

The nickel electrode-flexible separator unit is incorporated in a battery as illustrated in FIG. 5, together with a conventional cadmium electrode to form a nickel-cadmium battery, and in another case, the cadmium electrode-flexible separator unit is incorporated in a battery as illustrated in FIG. 5, together with a conventional silver electrode to form a silver-cadmium battery.

As in the case of silver-zinc battery of example 5, the above-noted nickel-cadmium and silver-cadmium batteries, respectively operate for over 1,000 charge-discharge cycles, at both 25° and 100° C., employing ½-hour charge-½-hour discharge cycles.

EXAMPLE 7

The procedure of examples 1 and 5 above is followed substantially except employing in place of polyphenylene oxide the same amount of polysulfone, and dimethyl acetamide solvent.

Results similar to those of examples 1 and 5 are obtained, except that the resistivity of the separator film is somewhat higher.

EXAMPLE 8

There is illustrated in FIG. 6, the incorporation of the electrode-separator unit produced according to example 5 and illustrated at 15 in FIG. 2, having a substantially inorganic flexible separator film 18 secured to the silver electrode 16, in a multiplate battery 52. In this arrangement, it is seen that four silver electrode-separator units 15 according to the invention are alternately disposed in relation to three zinc electrodes 40, with the flexible film 18 of the respective units 15 separating adjacent silver and zinc electrodes 16 and 40, respectively. The leads 42 from the silver electrodes 16 are collectively connected to the terminal 44, and the leads 48 from the zinc electrodes 40 are collectively connected to the terminal 50. It is seen that the separator units 15 with the flexible substantially inorganic separator film 18 connected thereto permits simple placement of these units in the battery with the respective zinc electrodes 40 disposed alternately therebetween, and insulating the respective silver and zinc electrode compartments.

As an alternative to forming a free flexible separator film, or a flexible separator applied to an electrode, there can be applied on a flexible porous substrate or matrix, a film consisting essentially of a mixture of a major portion of a porous particulate inorganic material, a minor portion of potassium titanate, a minor portion of a curable organic polymer such as polyphenylene oxide, and a monomeric or polymeric ester derived from the acids described above, removing the solvent, curing the coating and forming a flexible porous separator which is reinforced by a flexible porous matrix or carrier.

The impregnation of the mixture of inorganic and organic materials according to the present invention into a suitable flexible porous carrier renders the flexible separator stronger and more durable than in the absence of such carrier.

The flexible carrier containing the mixture of inorganic and organic separator materials, including the combination of organic components, according to the invention, is sufficiently durable and rugged so that, after preparation of the porous flexible separator film or sheet according to the invention, such sheet can be applied to conventional battery electrodes, such as zinc or silver electrodes, by wrapping the flexible film around one or both electrodes, or by forming the flexible porous separator into a compartment or box-shaped configuration, into which such an electrode or electrodes can be inserted.

Figure 7:
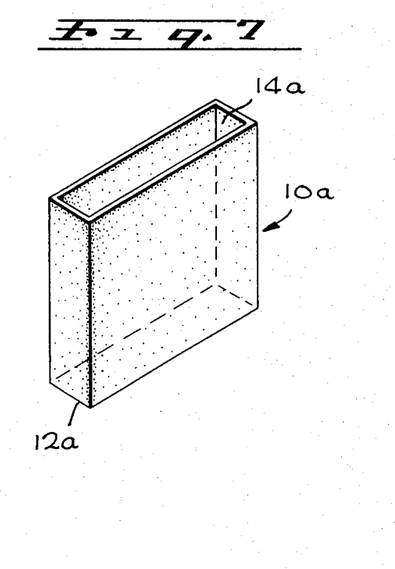
FIG. 7 is a representation of a box-shaped, flexible porous carrier or matrix for production of a porous separator in the form of an electrode compartment, according to the invention.

According to a preferred embodiment, a prefabricated envelope of box-shaped configuration, indicated at 10a in FIG. 7, is provided. The envelope 10a is in the form of a porous flexible carrier or matrix material of a type described more fully below, and is enclosed on all four sides, with a bottom portion 12a and an open end 14a, for receiving an electrode therein as described more fully below. The envelope or bag, in the form of the box-shaped compartment 10a, can be fabricated by folding, wrapping, heat-sealing or cementing the porous flexible carrier material to form the desired configuration to receive an electrode. Any flexible material, either organic or inorganic, preferably the latter, of sufficient strength and porosity and having high resistance to alkali, e.g., potassium hydroxide, and to oxidation, and which provides an electrode compartment with high structural integrity, can be employed. Thus, for example, flexible sheets or matts of inorganic material such as potassium titanate paper, asbestos, aluminosilicate sheets or matts, can be employed, and also suitable organic sheets or matts such as nylon, polytetrafluoroethylene (Teflon), polyphenylene oxide, polysulfone, polyethylene, polypropylene, copolymers of vinyl chloride and acrylonitrile, and the like, in the form of sheets, matts or paper, can be employed. The above-listed flexible porous matrix materials are understood to be exemplary only, and other materials having suitable characteristics noted above can also be utilized.

Figure 8:
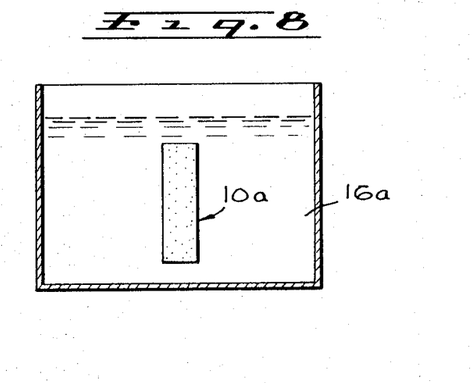
FIG. 8 illustrates a preferred mode of procedure for coating or impregnating the porous flexible box-shaped carrier or matrix of FIG. 7 for producing a modified form of porous separator according to the invention.

The porous flexible envelope 10a is then dipped or immersed in the slurry of inorganic separator material and organic components described above, illustrated at 16a in FIG. 8 of the drawing. The slurry of inorganic or ceramic powder and combination of organic components dissolved in the solvent, according to the invention, is preferably maintained in vibration during dipping of the porous flexible envelope 10a in such slurry 16a.

After the porous envelope 10a containing the separator coating or impregnated with the separator material is removed from the slurry or mixture, it is subjected to air drying to remove solvent, and the coating cured at elevated temperatures as described above. The resulting substantially inorganic separator film formed on or impregnated into the porous flexible envelope or matrix 10a, following curing, is highly flexible. This permits the insertion of an electrode 18a, as illustrated in FIG. 9, and preferably containing a collector grid indicated at 19a, into the envelope or box-shaped electrode compartment 10'a without damage to the flexible inorganic separator film, as a result of expansion of the sides of the envelope during the process of incorporating the electrode.

Figure 9:
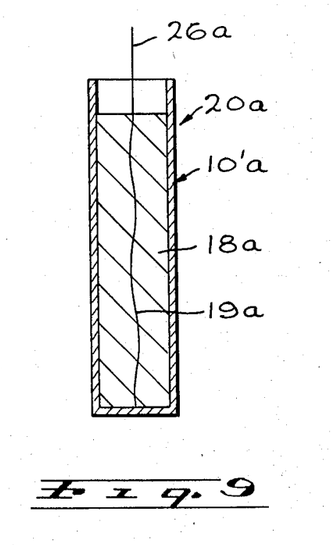
FIG. 9 shows incorporation of an electrode into the box-shaped porous flexible separator produced by the procedure illustrated in FIG. 8.

Instead of impregnating and coating the flexible porous envelope 10a first, followed by inserting an electrode therein, as illustrated in FIG. 9, in preferred practice an electrode, e.g., a zinc electrode, is first inserted into the flexible envelope, and the envelope containing the electrode is then preferably dipped into the slurry or mixture 16a of the separator materials as described above, followed by curing of the thus coated and impregnated flexible envelope, to provide a separator film on the flexible carrier with the electrode contained therein.

Total overall coating thickness on the various flexible porous matrix materials which can be employed can vary from about 0.001 to about 0.025 inches.

The thickness of the initial flexible matrix materials employed can range from about 0.003 to about 0.050 inches.

The porosity of the flexible separators of the invention, e.g., in the form of a flexible porous envelope or matrix, following impregnation or coating thereon with the separator material, can range from about 5 to about 35 percent, but such range is understood to be only exemplary.

Figure 10:
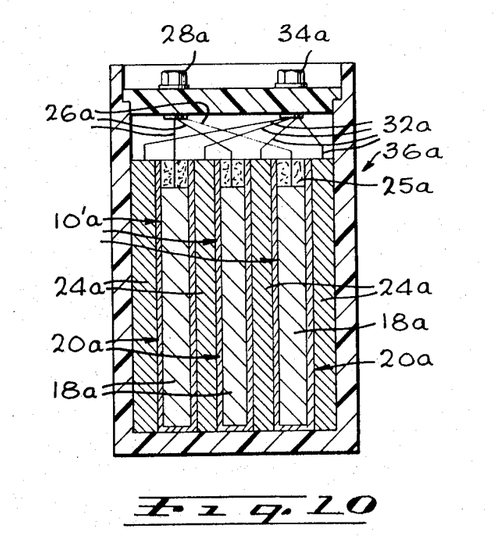
FIG. 10 illustrates an assembly of a plurality of the electrode-flexible separator units of FIG. 9, to form a multiplate battery.

There is illustrated in FIG. 10 the incorporation of the electrode-separator unit produced according to the invention and illustrated at 20a in FIG. 9, in the form of a flexible separator envelope 10'a containing zinc electrode 18a, in a multiplate battery 36a. In this arrangement, it is seen that three zinc electrode-separator units 20a including electrodes 18a, according to the invention, are alternately disposed in relation to four silver electrodes 24a, with the flexible film 10'a of the respective envelopes of electrode compartment units 20a separating adjacent zinc and silver electrodes 18a and 24a, respectively. If desired, although not necessary, a material such as Teflon felt, indicated at 15a, can be placed over the top of the zinc electrode 18a within the flexible separator envelope 10'a of each of the zinc electrode-flexible separator units 20a, to aid in retaining the electrolyte in the zinc electrode compartment. The leads 26a from the zinc electrodes 18a are collectively connected to the terminal 28a, and the leads 32a from the silver electrodes 24a are collectively connected to the terminal 34a. It is seen that the separator-electrode units 20a, with the flexible envelope 10'a, permit simple placement of these units in the battery with the respective silver electrodes 24a disposed alternately therebetween, and insulating the respective silver and zinc electrode compartments without the necessity for separate individual separators being incorporated in the battery with means for supporting such separators so as to insulate the electrode compartments.

Alternatively, a flexible porous matrix or sheet, coated or impregnated with the separator material according to the invention, and as described above, can be wrapped around one or a plurality of electrodes to provide a battery assembly.

It will be understood that, in the embodiment of FIG. 10, the conventional silver electrodes 24a can also be in the form of an electrode-separator unit, as illustrated in FIG. 9, according to the invention, in the form of a flexible porous separator envelope containing the silver electrode and produced, e.g., by dip-coating a flexible porous matrix or envelope 10a, by procedure as described above and inserting the silver electrode. In such modification, both the silver and zinc electrodes of FIG. 10 are thus covered and insulated by a flexible, essentially inorganic separator according to the invention. Alternatively, such silver electrode-separator units can be employed in conjunction with conventional zinc electrodes in a multiplate battery as illustrated in FIG. 10.

The following are additional examples of practice of the invention:

EXAMPLE 9

A slurry comprising a powder composed of a solid solution of magnesium silicate-iron silicate ceramic, potassium titanate particles, polyphenylene oxide, and a mixture of polypropylene polyazelates in chloroform is prepared as described in example 1 above.

A flexible porous pure asbestos (fuel cell asbestos) envelope of box-shaped configuration, as illustrated in FIG. 7 of the drawing, is dipped into the above slurry while maintaining the slurry under vibration by means of an AC solenoid, and stirred, to facilitate uniform saturation and coating of the flexible asbestos envelope and escape of air. After dipping, the asbestos coated and impregnated envelope is air-dried for 15 minutes to remove solvent, and is then oven-cured for 15 minutes at 350° F.

The resulting impregnated and coated asbestos envelope is highly flexible, has a porosity of about 14 percent, and a pore size ranging from about 5 to about 200 Angstroms, has good strength and can be handled readily without tearing. The thickness of the initial pure asbestos envelope is 0.010 inches, and the overall thickness of the coated and impregnated envelope is about 0.012 inches.

The resulting impregnated and coated flexible asbestos envelope forms an electrode compartment, and a standard zinc electrode is inserted therein to form a flexible separator-electrode unit, as indicated at FIG. 9 in the drawing.

The resulting separator-zinc electrode unit is incorporated in a battery employing two conventional silver electrodes with the flexible separator-zinc electrode assembly described above and illustrated in FIG. 9 disposed between the two silver electrodes. A 30 percent potassium hydroxide solution is employed as electrolyte in the battery.

The battery is charged and placed on a test stand and allowed to stand for 8 months. After such period on the test stand, the battery maintains its normal 1.86 OCV (open circuit voltage). At the end of the above period the cell is discharged and still has its original capacity of about 1.5 A.H. (ampere hours). This indicates complete integrity of the asbestos separator envelope during the above-noted 8-month period, and lack of any shorting of the battery as result of any disintegration of such separator envelope.

EXAMPLE 10

A unit in the form of a flexible pure asbestos (fuel cell asbestos) envelope, as illustrated at 10a in FIG. 7, and having a standard zinc electrode inserted therein, is dipped into a slurry as described in example 1 and processed as described in example 9 above, except that in place of the sintered powder in the form of a solid solution of magnesium silicate and iron silicate, a zirconium oxide powder is employed in the slurry.

A multiplate battery is assembled of the type illustrated in FIG. 10 of the drawing, employing four of the above separator-zinc electrode units each comprising a coated and impregnated flexible asbestos envelope, containing the zinc electrode as illustrated in FIG. 9, with five conventional silver electrodes in alternate relation, so that each flexible asbestos separator-zinc electrode unit is adjacent a pair of silver electrodes. A 30 percent potassium hydroxide solution is placed in the battery.

The above 5 A.H. capacity battery is subjected to total discharge tests, the battery being totally discharged for two hours at C/2½ (one-half capacity) and then totally discharged for more than 70 charge-discharge cycles. After 70 such cycles the battery is observed to maintain its OCV of 1.86 volts, and has its same 5 A.H. capacity, indicating that the flexible asbestos separator envelope remains intact without any shorting over the above test period.

EXAMPLE 11

A unit in the form of a flexible pure asbestos (fuel cell asbestos) envelope and having a standard zinc electrode inserted therein, is dipped into a slurry as described in example 1 or 3, except that in place of the solid solution of magnesium silicate and iron silicate, there is employed the same amount of calcia stabilized zirconia, as described above, and the unit is processed as described in example 7 above.

Such flexible separator-zinc electrode units are assembled together with conventional silver electrodes in a multiplate battery as described in example 10 above and illustrated in FIG. 10 of the drawing, to provide a 5 A.H. capacity battery.

The above battery is sterilized at 135° C., for 180 hours. The battery is then fully charged and placed on a charge stand. After 9 months, the battery still has its initial nominal 1.86 volts (open circuit voltage) indicating no shorting of the battery through the flexible separators.

EXAMPLE 12

The procedure of each of examples 1, 3, 7, 8 and 9 is repeated, except employing proportions of inorganic materials and organic polymers in the chloroform slurry such that based on the total solids content of the slurry, there is present a total of 60 percent of inorganic material and a total of 40 percent of polymers, including polyphenylene oxide and mixture of the polypropylene polyazelate polymers.

Results comparable to those of examples 1, 3, 7, 8 and 9 are obtained, the flexible separators provided according to this example being even more flexible than those produced in examples 1, 3, 7, 8 and 9, due to the increased proportion of organic polymers employed.

EXAMPLE 13

The procedure of examples 1, 5 and 9, respectively, is followed, except that in place of the mixture of 10 parts of the polypropylene polyazelate polymers employed in the chloroform solution, there is employed 10 parts of the respective monomeric esters (a) tetrahyrofurfuryl oleate, (b) triethylene glycol dipelargonate, (c) di-2-ethylhexyl azelate, (d) di-isooctyl azelate, and (e) diethylene glycol dipelargonate.

Results comparable to those of examples 1, 5, 7 and 9 are obtained.

From the foregoing it is seen that the invention provides a novel porous flexible separator composed chiefly of inorganic material, yet which can be formed into very thin films, such separators having improved low resistivity and being particularly useful in batteries, especially high energy density batteries, and being particularly effective for high rate battery applications.

While we have described particular embodiments of the invention for purposes of illustrations, it will be understood that various changes and modifications can be made therein within the spirit of the invention, and the invention accordingly is not to be taken as limited except by the scope of the appended claims.

We claim:

1. A flexible porous battery separator which comprises a major portion of an inorganic material, a minor portion of potassium titanate in the form of short fibers, and a minor portion of a mixture of a cured first organic polymer component and a second organic component selected from the group consisting of monomeric and polymeric azelate, pelargonate and oleate esters, said cured polymer component bonding the particles of said inorganic material and said potassium titanate fibers together, and forming a porous separator structure, said separator having a porosity in the range from about 5 to about 40 percent.

2. A flexible porous battery separator as defined in claim 1, said separator having a pore size ranging from about 1 to about 400 Angstrom units and a thickness of about 0.001 to about 0.025 inch, said separator being highly flexible, having very low resistivity and being heat sterilizable at elevated temperature for an extended period of time.

3. A flexible porous battery separator as defined in claim 1, said second organic component being selected from the group consisting of monomeric and polymeric azelate, pelargonate and oleate esters, said polymeric esters having an average molecular weight range from about 800 to about 10,000, said inorganic material being present in an amount of about 50 to about 95 percent, said potassium titanate fibers being present in an amount of about 2 to about 35 percent, the total amount of said first and second organic components being present in an amount of about 2 to about 48 percent, by weight.

4. A flexible porous battery separator as defined in claim 1, said first organic component being polyphenylene oxide, said second organic component being selected from the group consisting of di-2-ethylhexyl azelate, di-isooctyl azelate, di-n-hexyl azelate, diethylene glycol dipelargonate, triethylene glycol dipelargonate, butanediol dipelargonate, 2-butoxyethyl dipelargonate, tetrahydrofurfuryl oleate, and diethylene glycol monooleate, said inorganic material being present in an amount of about 50 to about 95 percent, said potassium titanate fibers being present in an amount of about 2 to about 35 percent, the total amount of said first and second organic components being present in an amount of about 2 percent to about 48 percent, by weight.

5. A flexible porous battery separator as defined in claim 1, said first organic component being polyphenylene oxide and wherein said second organic component is polypropylene polyazelate having an average molecular weight range from about 2,000 to about 6,000, said inorganic material being present in an amount of about 50 to about 95 percent, said potassium titanate fibers being present in an amount of about 2 to about 35 percent, the total amount of said first and second organic components being present in an amount of about 2 percent to about 48 percent, by weight.

6. A flexible porous battery separator as defined in claim 1, said first organic component being polyphenylene oxide and wherein said second organic component is a mixture of polypropylene polyazelate having an average molecular weight range from about 2,000 to about 6,000 and polypropylene polyazelate containing phthalate and alkanoate as additives, said polyazelate having an average molecular weight range from about 850 to about 6,000, said inorganic material being present in an amount of about 50 to about 95 percent, said potassium titanate fibers being present in an amount of about 2 to about 35 percent, the total amount of said first and second organic components being present in an amount of about 2 to about 48 percent, by weight.

7. A flexible porous battery separator as defined in claim 5, said particulate inorganic material being selected from the group consisting of (a) a solid solution of magnesium silicate and a member selected from the group consisting of zinc silicate and iron silicate, (b) zirconia, (c) a solid solution of a major portion of magnesium oxide and a minor proportion of an oxide selected from the group consisting of zirconium dioxide and chromic oxide, and (d) a solid solution of ferrochromite.

8. A porous flexible membrane as defined in claim 1, including a support for said separator in the form of a metal battery electrode, said flexible porous separator being secured to the surface of said electrode.

9. A flexible porous separator as defined in claim 7, including a support for said separator in the form of a metal battery electrode, said flexible porous separator being secured to the surface of said electrode.

10. A battery comprising a pair of electrodes of opposite polarity, and positioned between said electrodes for retaining electrolyte, a flexible porous separator as defined in claim 1.

11. A battery comprising a pair of electrodes of opposite polarity, and positioned between said electrodes for retaining electrolyte, a flexible porous separator as defined in claim 7.

12. A battery comprising a pair of electrodes of opposite polarity, and positioned between said electrodes for retaining electrolyte, a flexible porous separator as defined in claim 1, said separator being secured to the surface of at least one of said electrodes and forming an electrode-separator unit.

13. A battery comprising a pair of electrodes of opposite polarity, and positioned between said electrodes for retaining electrolyte, a flexible porous separator as defined in claim 7, said separator being secured to the surface of at least one of said electrodes and forming an electrode-separator unit.

14. A battery as defined in claim 12, including a plurality of said electrode-separator units, and a plurality of second electrode members arranged in side-by-side relation, with said electrode-separator units in alternating arrangement with said electrode members.

15. A flexible porous separator as defined in claim 1, including a support for said separator in the form of a flexible porous substrate, said separator being impregnated in and coated on said flexible porous substrate.

16. A flexible porous separator as defined in claim 7, including a support for said separator in the form of a flexible porous substrate composed of a material selected from the group consisting of flexible potassium titanate, asbestos and nylon, in the form of sheets, matts or paper, said separator being impregnated in and coated on said flexible porous substrate.

17. A flexible porous battery separator as defined in claim 15, said flexible porous separator being box shaped and receiving a battery electrode, and forming an electrode-separator unit.

18. A flexible porous battery separator as defined in claim 16, said flexible porous separator being box shaped and receiving a battery electrode, and forming an electrode-separator unit.

19. A battery comprising a pair of electrodes of opposite polarity and positioned between said electrodes for retaining electrolyte, a flexible porous separator as defined in claim 15.

20. A battery as defined in claim 19, including a plurality of said electrode-separator units, and a plurality of second electrode members arranged in side-by-side relation, with said electrode-separator units in alternating arrangement with said electrode members.

21. A flexible porous battery separator as defined in claim 1, said second organic component being selected from the group consisting of monomeric and polymeric azelate, pelargonate and oleate aliphatic esters, wherein the aliphatic radical of said aliphatic esters contains from about two to about 12 carbon atoms, said inorganic material being present in an amount of about 50 to about 95 percent, said potassium titanate fibers being present in an amount of about 2 to about 35 percent, the total amount of said first and second organic components being present in an amount of about 2 percent to about 48 percent, by weight.

22. A flexible porous battery separator as defined in claim 1, said second organic component containing a member selected from the group consisting of phthalates, alkanoates, and alkanes, as additive, having from eight to 16 carbon atoms.

23. A flexible porous battery separator as defined in claim 3, the proportion of said second organic component present in said mixture of said first organic component and said second organic component ranging from about 5 to about 50 percent by weight of said mixture.

24. A flexible porous battery separator as defined in claim 6, the proportion of said second organic component present in said mixture of said first organic component and said second organic component ranging from about 5 to about 50 percent by weight of said mixture.

* * * * *